United States Patent
Park et al.

(10) Patent No.: US 10,923,747 B2
(45) Date of Patent: Feb. 16, 2021

(54) STOP CONTROL METHOD FOR FUEL CELL SYSTEM

(71) Applicants: Hyundai Motor Company, Seoul (KR); Kia Motors Corporation, Seoul (KR)

(72) Inventors: Gun Hyung Park, Gyeonggi-do (KR); Hyun Hie Kim, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 257 days.

(21) Appl. No.: 16/017,103

(22) Filed: Jun. 25, 2018

(65) Prior Publication Data

US 2019/0288308 A1    Sep. 19, 2019

(30) Foreign Application Priority Data

Mar. 14, 2018 (KR) .................. 10-2018-0029506

(51) Int. Cl.
| | |
|---|---|
| *H01M 8/00* | (2016.01) |
| *H01M 8/04228* | (2016.01) |
| *H01M 8/04303* | (2016.01) |
| *H01M 8/04858* | (2016.01) |
| *H01M 8/04537* | (2016.01) |

(Continued)

(52) U.S. Cl.
CPC ......... *H01M 8/04228* (2016.02); *B60L 50/72* (2019.02); *B60L 53/00* (2019.02); *H01M 8/04303* (2016.02); *H01M 8/04559* (2013.01); *H01M 8/04925* (2013.01)

(58) Field of Classification Search
CPC .......... B60L 53/00; B60L 58/30; B60L 50/72; H01M 8/04559; H01M 8/04925; H01M 8/04228
See application file for complete search history.

(56) References Cited

U.S. PATENT DOCUMENTS

| | | | |
|---|---|---|---|
| 2012/0138261 A1* | 6/2012 | Park | B60L 58/34 |
| | | | 165/43 |
| 2018/0069254 A1* | 3/2018 | Lee | H01M 8/04302 |

FOREIGN PATENT DOCUMENTS

| | | |
|---|---|---|
| JP | 201672106 A | 5/2016 |
| KR | 20090014769 A | 2/2009 |

(Continued)

*Primary Examiner* — Cynthia H Kelly
*Assistant Examiner* — Monique M Wills
(74) *Attorney, Agent, or Firm* — Mintz Levin Cohn Ferris Glovsky and Popeo, P.C.; Peter F. Corless (57) ABSTRACT

A stop control method for a fuel cell system of a vehicle can include: determining whether a fuel cell of the fuel cell system is shut down when a key-off signal is received; comparing a voltage of the fuel cell with a first set voltage when it is determined that the fuel cell is not shut down; controlling a voltage of a high-voltage terminal downwardly when the voltage of the fuel cell is larger than the first set voltage; turning on a cathode oxygen depletion (COD) relay a first time after controlling the voltage of the high-voltage terminal downwardly; turning off a high-voltage terminal relay a first time after turning on the COD relay, the high-voltage relay disposed between the fuel cell and the high-voltage terminal; and shutting down the fuel cell and performing key-off control after turning off the high-voltage terminal relay.

6 Claims, 4 Drawing Sheets

(51) Int. Cl.
  *B60L 53/00* (2019.01)
  *B60L 50/72* (2019.01)

(56) References Cited

FOREIGN PATENT DOCUMENTS

| | | |
|---|---|---|
| KR | 20170069374 A | 6/2017 |
| WO | 2017154802 A1 | 9/2017 |

* cited by examiner

STOP CONTROL METHOD FOR FUEL CELL SYSTEM

CROSS-REFERENCE TO RELATED APPLICATION

The present application claims the benefit of priority to Korean Patent Application No. 10-2018-0029506, filed on Mar. 14, 2018 in the Korean Intellectual Property Office, the entire contents of which are incorporated herein by reference.

BACKGROUND OF THE DISCLOSURE

Field of the Disclosure

The present disclosure relates generally to vehicular technologies and, more particularly, to a stop control method for a fuel cell system for preventing a fuel cell from being exposed to an open circuit voltage (OCV) when a key-off state is required.

Description of the Related Art

Compared to conventional power generation methods, a fuel cell is highly efficient in power generation and causes no emission of pollutants. Thus, the fuel cell is often regarded as a power generation technology of the future. The fuel cell has also been studied as a power source of vehicles to solve problems of energy conservation, environmental pollution, global warming, etc.

Fuel cells oxidize a substance with activity, such as hydrogen, LNG, LPG, methanol, etc. through an electrochemical reaction, and convert the chemical energy released in the above process into electricity. Generally, hydrogen that may be easily produced from natural gas and oxygen from air are used.

In a hybrid vehicle to which fuel cells can be applied, a high-voltage DC-DC converter (HDC) may be positioned between the fuel cell and a high-voltage battery to compensate for the voltage difference between the fuel cell and the battery. The HDC can perform charging/discharging control of the battery or power control of the fuel cell. Additionally, the fuel cell can be connected to a cathode oxygen depletion (COD) heater so as to consume the remaining voltage before being stopped.

Generally, when a fuel cell system is intended to be stopped (e.g., due to shutdown of the vehicle), a high-voltage terminal relay provided between the fuel cell and high-voltage electronic components is opened. Then, a COD relay provided between the fuel cell and the COD heater is closed, whereby the voltage of the fuel cell is consumed as heat by the COD heater.

However, since the fuel cell is exposed to an open circuit voltage (OCV) with the high-voltage terminal relay opened, unnecessary voltage is generated. In order to prevent this phenomenon, when the COD relay is operated before the high-voltage terminal relay, the voltage of the high-voltage terminal is higher than the voltage of the fuel cell. However, the current of the high-voltage battery is consumed unnecessarily.

Figure 1:
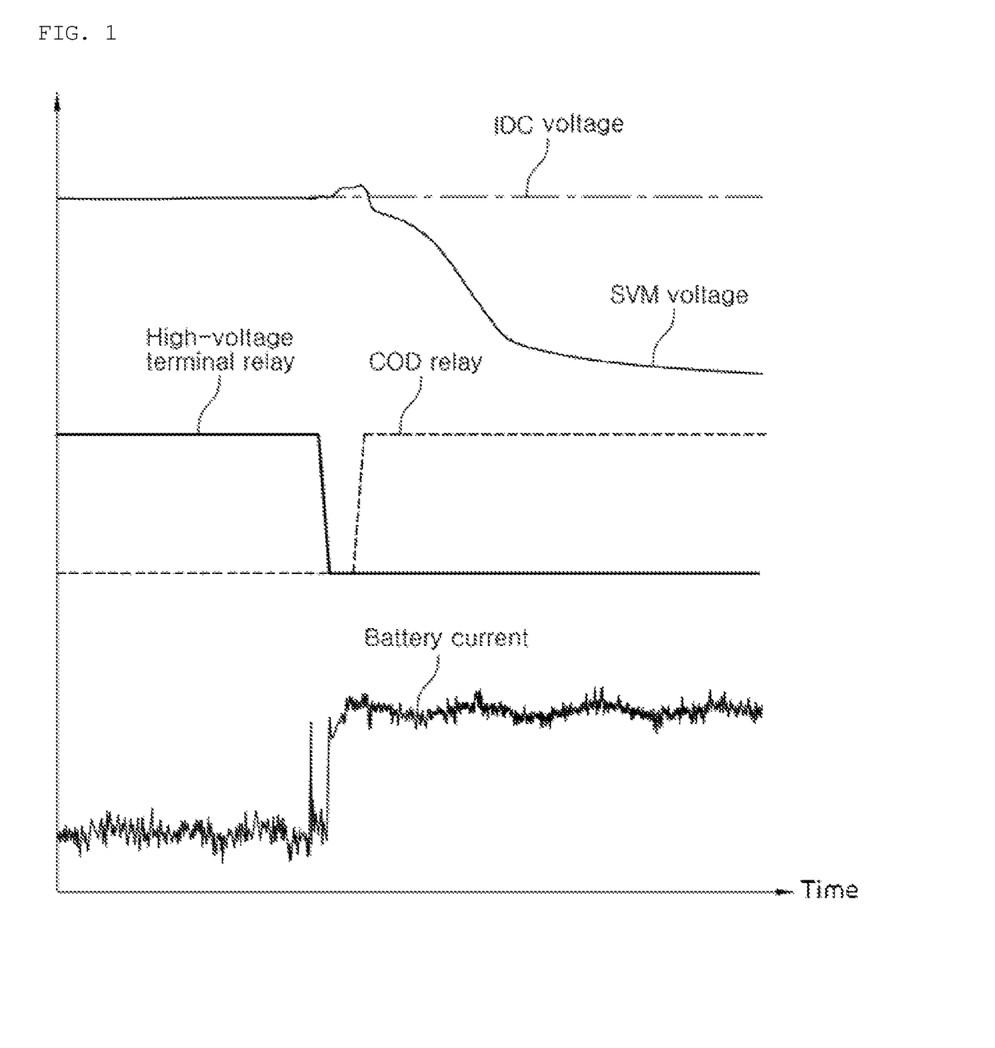
FIG. 1 is a graph schematically illustrating voltages and control signals when a fuel cell system is stopped in a conventional manner.

FIG. 1 is a graph schematically illustrating voltages and control signals when a fuel cell system is stopped in a conventional manner. Here, a stack voltage monitor (SVM) voltage means a value obtained monitoring the voltage of the fuel cell.

As shown in FIG. 1, the high-voltage terminal relay is opened with the COD relay opened. Thus, the fuel cell is exposed to the open circuit voltage, and a rapid rise is shown. This overvoltage is a factor that degrades durability of the fuel cell.

The foregoing is intended merely to aid in the understanding of the background of the present disclosure, and is not intended to mean that the present disclosure falls within the purview of the related art that is already known to those skilled in the art.

SUMMARY OF THE DISCLOSURE

Accordingly, the present disclosure has been made keeping in mind the above problems occurring in the related art. The present disclosure is intended to propose a stop control method for a fuel cell system that controls a stopping point of a high-voltage terminal relay and a connecting point of a COD relay that are connected to a fuel cell so as to prevent overvoltage from occurring even in the process of stopping the fuel cell system. As a result, durability of the fuel cell stack can be enhanced.

In order to achieve the above object, according to embodiments of the present disclosure, a stop control method for a fuel cell system of a vehicle can include: determining, by a controller, whether a fuel cell of the fuel cell system is shut down when a key-off signal is received indicating that key-off of the vehicle is required; comparing, by the controller, a voltage of the fuel cell with a first set voltage when it is determined that the fuel cell is not shut down; controlling, by the controller, a voltage of a high-voltage terminal downwardly when the voltage of the fuel cell is larger than the first set voltage; turning on, by the controller, a cathode oxygen depletion (COD) relay a first time after controlling the voltage of the high-voltage terminal downwardly; turning off, by the controller, a high-voltage terminal relay a first time after turning on the COD relay, the high-voltage relay disposed between the fuel cell and the high-voltage terminal; and shutting down, by the controller, the fuel cell and performing key-off control after turning off the high-voltage terminal relay.

The turning off of the high-voltage terminal relay the first time can include turning off, by the controller, the high-voltage terminal relay the first time when a difference between the voltage of the fuel cell and the voltage of the high-voltage terminal is less than a second set voltage.

The method may further include: turning off, by the controller, the high-voltage terminal relay a second time when it is determined that the fuel cell is shut down; and turning on, by the controller, the COD relay a second time after turning off the high-voltage terminal relay the second time. The shutting down of the fuel cell can be performed after turning on the COD relay the second time.

The turning off of the high-voltage terminal relay the second time can include turning off, by the controller, the high-voltage terminal relay the second time when the voltage of the fuel cell is equal to or less than the first set voltage.

The shutting down of the fuel cell can include shutting down, by the controller, the fuel cell when the voltage of the fuel cell is equal to or less than a third set voltage which is lower than the first set voltage.

Furthermore, according to embodiments of the present disclosure, a stop control system can include: a fuel cell system of a vehicle, the fuel cell system including a fuel cell; and a controller equipped in the vehicle, the controller configured to: determine whether the fuel cell is shut down when a key-off signal is received indicating that key-off of the vehicle is required, compare a voltage of the fuel cell with a first set voltage when it is determined that the fuel cell is not shut down, control a voltage of a high-voltage terminal downwardly when the voltage of the fuel cell is larger than the first set voltage, turn on a cathode oxygen depletion (COD) relay a first time after controlling the voltage of the high-voltage terminal downwardly, turn off a high-voltage terminal relay a first time after turning on the COD relay, the high-voltage relay disposed between the fuel cell and the high-voltage terminal, and shut down the fuel cell and performing key-off control after turning off the high-voltage terminal relay.

Furthermore, according to embodiments of the present disclosure, non-transitory computer readable medium can contain program instructions for performing a stop control method for a fuel cell system of a vehicle, which when executed can cause a controller to: determine whether a fuel cell of the fuel cell system is shut down when a key-off signal is received indicating that key-off of the vehicle is required; compare a voltage of the fuel cell with a first set voltage when it is determined that the fuel cell is not shut down; control a voltage of a high-voltage terminal downwardly when the voltage of the fuel cell is larger than the first set voltage; turn on a cathode oxygen depletion (COD) relay a first time after controlling the voltage of the high-voltage terminal downwardly; turn off a high-voltage terminal relay a first time after turning on the COD relay, the high-voltage relay disposed between the fuel cell and the high-voltage terminal; and shut down the fuel cell and performing key-off control after turning off the high-voltage terminal relay.

According to the stop control method for the fuel cell system with the above-described structure, the fuel cell is not exposed to an open circuit voltage (OCV) even when the fuel cell system is stopped, whereby reduction in durability of the fuel cell due to occurrence of overvoltage may be prevented. Also, when the fuel cell system is stopped, discharge of the high-voltage battery may be prevented. As a result, marketability of the fuel cell system may be enhanced.

BRIEF DESCRIPTION OF THE DRAWINGS

The above and other objects, features and other advantages of the present disclosure will be more clearly understood from the following detailed description when taken in conjunction with the accompanying drawings, in which.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. The controller may control operation of units, modules, parts, or the like, as described herein. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Hereinbelow, a stop control method for a fuel cell system according to embodiments of the present disclosure will be described.

Figure 2:
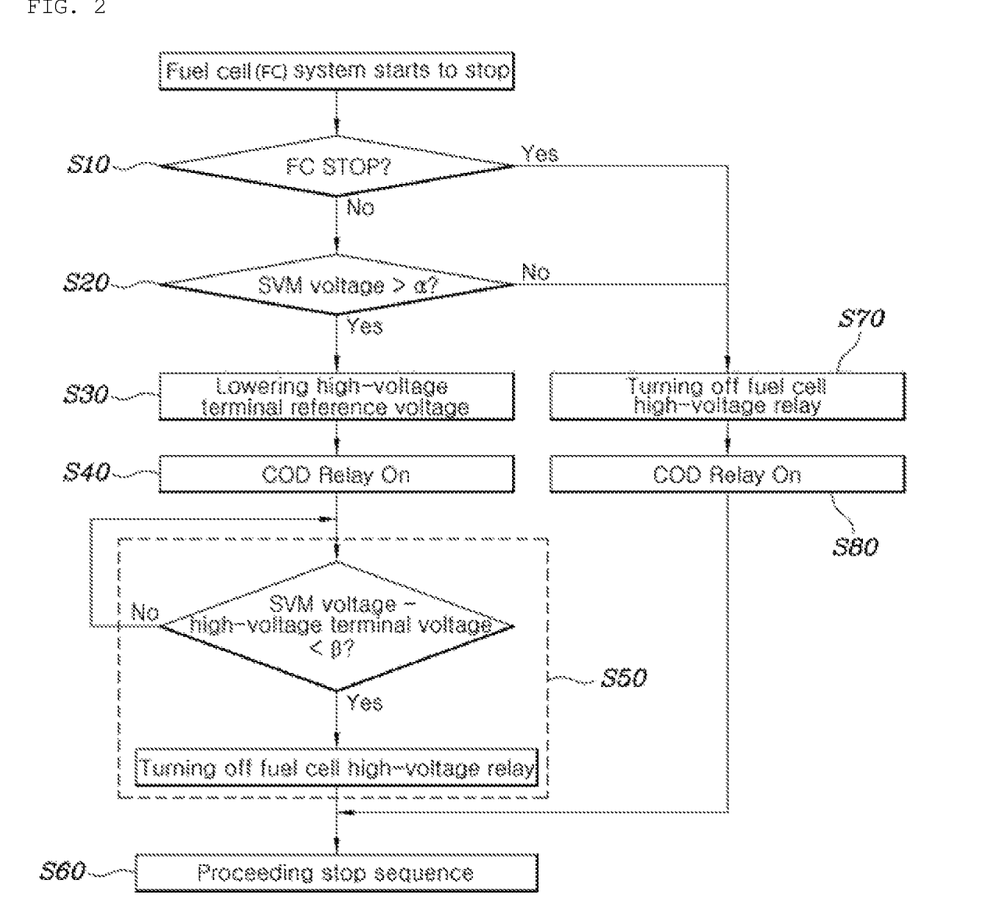
FIG. 2 is a flowchart illustrating a stop control method for a fuel cell system according to embodiments of the present disclosure.
Figure 3:
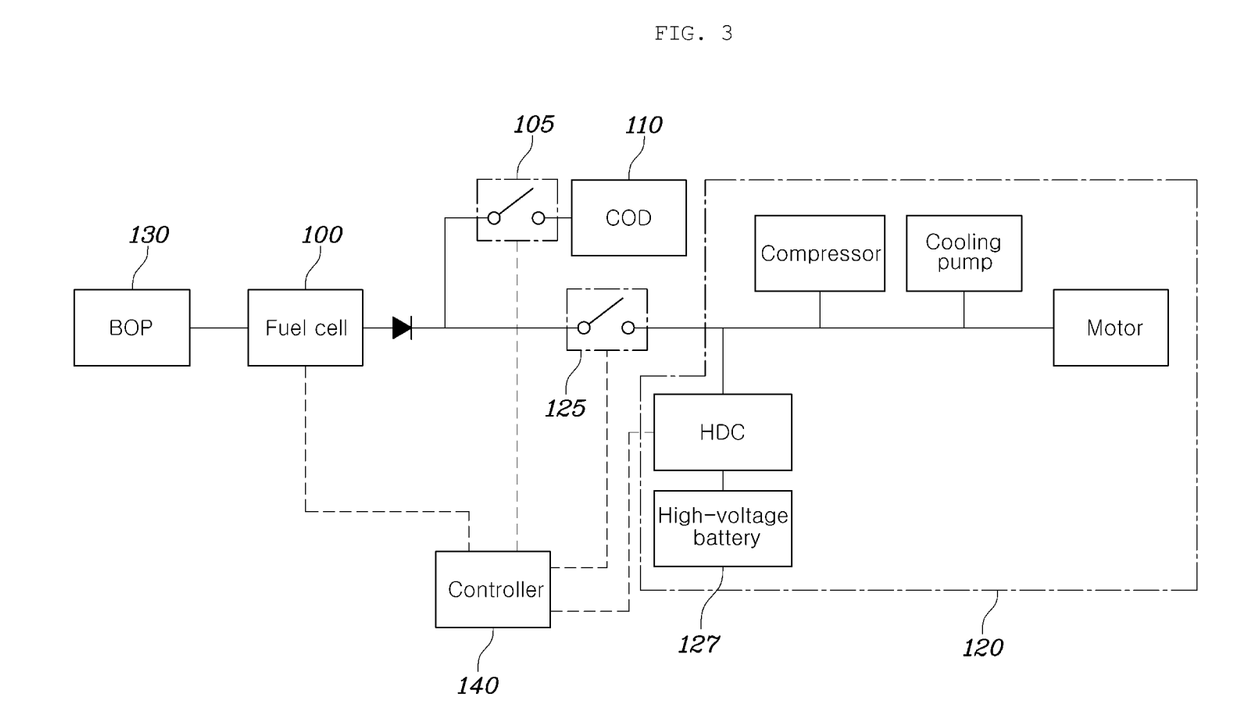
FIG. 3 is a block diagram schematically illustrating a fuel cell system according to embodiments of the present disclosure.
Figure 4:
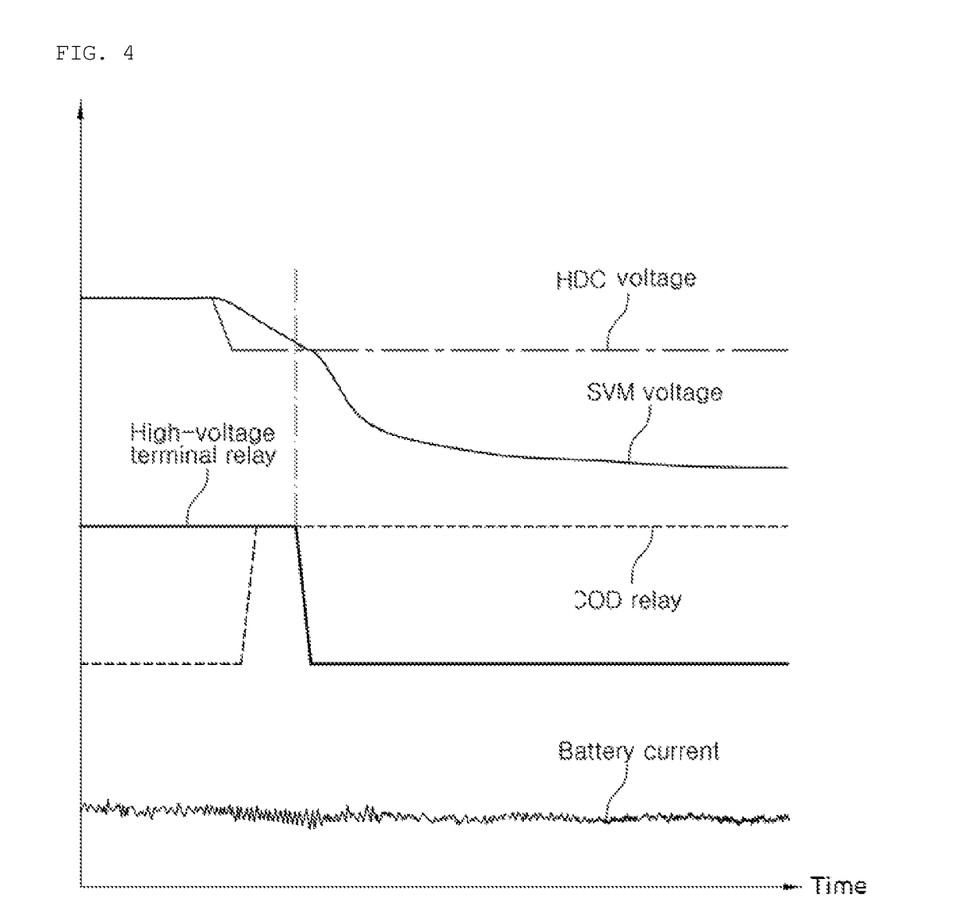
FIG. 4 is a graph illustrating flow of a voltage of a fuel cell and control signals according to the stop control method for the fuel cell system of FIG. 2.

FIG. 2 is a flowchart illustrating a stop control method for a fuel cell system according to embodiments of the present disclosure. FIG. 3 is a block diagram schematically illustrating a fuel cell system according to embodiments of the present disclosure. FIG. 4 is a graph illustrating flow of a voltage of a fuel cell and control signals according to the stop control method for the fuel cell system of FIG. 2.

Referring to FIGS. 2 to 4, the stop control method for the fuel cell system according to embodiments of the present disclosure may include: determining, at a fuel cell check step S10 by a controller 140, whether or not a fuel cell 100 is shut down when a key-off signal is received indicating that key-off of the vehicle in which the fuel cell is installed is required; comparing, at a voltage comparison step S20 by the controller 140, a voltage of the fuel cell 100 with a first set voltage $\alpha$ when the fuel cell 100 is in operation as a result of performing the fuel cell check step S10; controlling, at a voltage downwards control step S30 by the controller 140, a voltage of a high-voltage terminal downwardly when the voltage of the fuel cell 100 is larger than the first step voltage $\alpha$ as a result of performing the voltage comparison step S20; turning on, at a first COD control step S40 by the controller 140, a COD relay 105 (a first time) after the voltage downwards control step S30; turning off, at a first high-voltage blocking step S50 by the controller 140, a high-voltage terminal relay 125 (a first time), the high-voltage terminal relay 125 being disposed between the fuel cell 100 and high-voltage terminal components 120, after the first COD control step S40; and shutting down, at a system stop step S60 by the controller 140, the fuel cell 100 and performing key-off control after the first high-voltage blocking step S50.

First, as shown in FIG. 3, in the fuel cell system of the hybrid vehicle, the fuel cell 100 is connected to a COD 110 and high-voltage components 120 via the cathode oxygen depletion (COD) relay 105 and the high-voltage terminal relay 125, respectively.

The high-voltage components 120 include a high-voltage battery 127, a high-voltage DC-DC converter (HDC) compensating for the voltage between the fuel cell 100 and the high-voltage battery 127, a compressor which is an electronic component powered by the compensated voltage by the HDC, a cooling pump, a motor, etc.

In FIG. 3, only the compressor, the cooling pump, and the motor are illustrated as electronic components, but various other electronic components may be installed. A detailed description thereof will be omitted.

Also, the fuel cell 100 may be connected to balance of plants (BOP) 130 protecting stack operations.

The controller 140 is configured to sense the voltage of the fuel cell 100, to control the COD relay 105 and the high-voltage terminal relay 125, and to control the voltage of the high-voltage terminal via the HDC.

According to this configuration, referring to FIGS. 2 and 3, the controller 140 first determines whether a key-off signal is received from the driver or vehicle control indicating that key-off of the vehicle is required, and determines whether or not stopping of the fuel cell system starts. When the fuel cell system starts to stop, the controller 140 checks whether the fuel cell 100 is shut down to recognize the state of the fuel cell 100 at step S10.

In the case where key-off of the fuel cell system is required, when the fuel cell 100 is not stopped, the controller 140 compares the voltage of the fuel cell 100 with the first set voltage $\alpha$ to determine whether voltage drop is required at step S20.

Here, the first set voltage $\alpha$ may be set to a voltage serving as a criterion to determine whether the fuel cell 100 is provided with an excessively high voltage. The voltage value set according to a vehicle or a designer may vary, and thus should not be limited to a specific value.

As a result of performing the voltage comparison step S20, when the voltage of the fuel cell 100 is larger than the first set voltage $\alpha$, the controller 140 controls the voltage provided to the high-voltage terminal components downwards via the HDC at step S30, and then may turn on the COD relay 105 at step S40.

In the case where the voltage of high-voltage terminal is higher the voltage of the fuel cell 100, when the COD relay 105 is turned on, the current of the high-voltage battery flows to the COD 110 and battery discharge may occur unnecessarily.

Therefore, according to the present disclosure, before turning on the COD relay 105, the voltage of the high-voltage terminal is controlled downwards to a particular value via the HDC. Thus, even though the voltage of the fuel cell 100 is lowered, it is lower than the voltage of the high-voltage terminal such that battery discharge may be prevented.

Moreover, the voltage remaining in the fuel cell 100 may be rapidly consumed through the COD 110 such that the time required for the fuel cell stop sequence may be effectively shortened.

After performing the first COD control step S40, the controller 140 may turn off the high-voltage terminal relay 125 provided between the fuel cell 100 and the high-voltage terminal components 120 at step S50.

That is, after the voltage of the fuel cell 100 is consumed by a particular amount through the first COD control step S40, the high-voltage terminal relay 125 is turned off such that the fuel cell 100 may be released from loads consisting of the high-voltage terminal components 120 to prepare the shut-down state of the fuel cell 100.

Next, the controller 140 shuts down the fuel cell 100 and controls the vehicle to be in key-off such that the fuel cell system may be stopped while preventing overvoltage of the fuel cell 100 or unnecessary discharge of the high-voltage battery 127 at step S60.

Here, at the first high-voltage blocking step S50, when the difference value between the voltage of the fuel cell 100 and the voltage of the high-voltage terminal is less than a second set voltage $\beta$, the controller 140 may turn off the high-voltage terminal relay 125. That is, the controller 140 gradually reduces the voltage of the fuel cell 100 by turning on the COD relay 105 through the first COD control step S40. Here, the high-voltage terminal relay 125 is turned off before the voltage of the fuel cell is lower than the voltage of the high-voltage terminal, whereby discharge of the high-voltage battery 127 may be prevented and shut down of the fuel cell 100 may be prepared.

The second set voltage $\beta$ may be set to a difference voltage between the voltage of the fuel cell 100 and the voltage of the high-voltage terminal at the time determined as it is appropriate to turn off the high-voltage terminal relay 125. The second set voltage $\beta$ may vary according to the designer or the vehicle.

Referring next to FIG. 4, in the case where stoppage of the fuel cell system is required, when the voltage of the fuel cell is larger than the first set voltage, the voltage (HDC voltage) of the high-voltage terminal is controlled downwardly (i.e., lowered), and then the COD relay is turned on. Thus, the voltage (SVM voltage) of the fuel cell is gradually lowered. The high-voltage terminal relay is turned off immediately before the voltage (SVM voltage) of the fuel cell meets the voltage (HDC voltage) of the high-voltage terminal, such that unnecessary discharge of the high-voltage battery may be prevented.

Referring to FIGS. 2 and 3 again, the stop control method for the fuel cell system according to embodiments of the present disclosure may further include: turning off, at a second high-voltage blocking step S70 by the controller 140, the high-voltage terminal relay 125 a second time when the fuel cell 100 is shut down as the result of performing the fuel cell check step S10; and turning on, at a second COD control step S80 by the controller 140, the COD relay 105 a second time after the second high-voltage blocking step S70.

After the second COD control step S80, the controller 140 may perform the system stop step S60. That is, in the case where the fuel cell 100 is already shut down, when key-off of the vehicle is required, overvoltage of the fuel cell 100 does not occur until the COD relay 105 is turned on later, even through the high-voltage terminal relay 125 is immediately turned off because the remaining voltage of the fuel cell 100 is low.

Therefore, without performing unnecessary control, the high-voltage terminal relay 125 and the COD relay 105 may be controlled such that the remaining voltage of the fuel cell 100 may be rapidly reduced.

Also, as the result of performing the voltage comparison step S20, when the voltage of the fuel cell 100 is equal to or less than the first set voltage α, the controller 140 may perform the second high-voltage blocking step S70. That is, in the case where key-off of the hybrid vehicle is required while the fuel cell 100 is in operation, when the voltage of the fuel cell 100 is equal to or less than the first set voltage α, overvoltage does not occur in the fuel cell 100 even though the high-voltage terminal relay 125 is released.

Therefore, since it is unnecessary to perform the logic of securing durability of the fuel cell 100, the controller 140 performs the second high-voltage blocking step S70 and the second COD control step S80 such that the remaining voltage of the fuel cell 100 may be rapidly reduced.

In the meantime, at the system stop step S60, when the voltage of the fuel cell 100 is equal to or less than a third set voltage which is set lower than the first set voltage α, the controller 140 may shut down the fuel cell 100. That is, when the controller 140 determines that the voltage of the fuel cell 100 is sufficiently reduced as being equal to or being less than the third set voltage, the controller 140 may shut down the fuel cell 100 and may control the vehicle to be in key-off, whereby the fuel cell system may be smoothly stopped.

According to the stop control method for the fuel cell system with the above-described structure, even when the fuel cell system is stopped, the fuel cell is not exposed to the open circuit voltage (OCV), whereby durability reduction of the fuel cell caused by occurrence of overvoltage may be prevented. Also, it is possible to prevent discharge of the high-voltage battery when the fuel cell system is stopped, whereby marketability off the fuel cell system may be enhanced.

Although certain embodiments of the present disclosure have been described, those skilled in the art will appreciate that various modifications, additions and substitutions are possible, without departing from the scope and spirit of the disclosure as disclosed in the accompanying claims.

What is claimed is:

1. A stop control method for a fuel cell system of a vehicle, the stop control method comprising:

determining, by a controller, whether a fuel cell of the fuel cell system is shut down when a key-off signal is received indicating that key-off of the vehicle is required;

comparing, by the controller, a voltage of the fuel cell with a first set voltage when it is determined that the fuel cell is not shut down;

controlling, by the controller, a voltage of a high-voltage terminal downwardly when the voltage of the fuel cell is larger than the first set voltage;

turning on, by the controller, a cathode oxygen depletion (COD) relay a first time after controlling the voltage of the high-voltage terminal downwardly;

turning off, by the controller, a high-voltage terminal relay a first time after turning on the COD relay, the high-voltage relay disposed between the fuel cell and the high-voltage terminal; and shutting down, by the controller, the fuel cell and performing key-off control after turning off the high-voltage terminal relay, wherein the turning off of the high-voltage terminal relay the first time comprises turning off, by the controller, the high-voltage terminal relay the first time when a difference between the voltage of the fuel cell and the voltage of the high-voltage terminal is less than a second set voltage.

2. The stop control method of claim 1, further comprising:

turning off, by the controller, the high-voltage terminal relay a second time when it is determined that the fuel cell is shut down; and turning on, by the controller, the COD relay a second time after turning off the high-voltage terminal relay the second time, wherein the shutting down of the fuel cell is performed after turning on the COD relay the second time.

3. The stop control method of claim 2, wherein the turning off of the high-voltage terminal relay the second time comprises turning off, by the controller, the high-voltage terminal relay the second time when the voltage of the fuel cell is equal to or less than the first set voltage.

4. The stop control method of claim 1, wherein the shutting down of the fuel cell comprises shutting down, by the controller, the fuel cell when the voltage of the fuel cell is equal to or less than a third set voltage which is lower than the first set voltage.

5. A stop control system comprising:

a fuel cell system of a vehicle, the fuel cell system including a fuel cell; and a controller equipped in the vehicle, the controller configured to:

determine whether the fuel cell is shut down when a key-off signal is received indicating that key-off of the vehicle is required, compare a voltage of the fuel cell with a first set voltage when it is determined that the fuel cell is not shut down, control a voltage of a high-voltage terminal downwardly when the voltage of the fuel cell is larger than the first set voltage, turn on a cathode oxygen depletion (COD) relay a first time after controlling the voltage of the high-voltage terminal downwardly, turn off a high-voltage terminal relay a first time after turning on the COD relay, the high-voltage relay disposed between the fuel cell and the high-voltage terminal, and shut down the fuel cell and performing key-off control after turning off the high-voltage terminal relay, wherein in the turning off of the high-voltage terminal relay the first time the controller is configured to turn off the high-voltage terminal relay the first time when a difference between the voltage of the fuel cell and the voltage of the high-voltage terminal is less than a second set voltage.

6. A non-transitory computer readable medium containing program instructions for performing a stop control method for a fuel cell system of a vehicle, the program instructions when executed by a controller causing the controller to:

determine whether a fuel cell of the fuel cell system is shut down when a key-off signal is received indicating that key-off of the vehicle is required;

compare a voltage of the fuel cell with a first set voltage when it is determined that the fuel cell is not shut down;

control a voltage of a high-voltage terminal downwardly when the voltage of the fuel cell is larger than the first set voltage;

turn on a cathode oxygen depletion (COD) relay a first time after controlling the voltage of the high-voltage terminal downwardly;

turn off a high-voltage terminal relay a first time after turning on the COD relay, the high-voltage relay disposed between the fuel cell and the high-voltage terminal; and shut down the fuel cell and performing key-off control after turning off the high-voltage terminal relay, wherein in the turning off of the high-voltage terminal relay the first time the controller is configured to turn off the high-voltage terminal relay the first time when a difference between the voltage of the fuel cell and the voltage of the high-voltage terminal is less than a second set voltage.

* * * * *